United States Patent
Zhang

(10) Patent No.: US 8,050,573 B2
(45) Date of Patent: Nov. 1, 2011

(54) OPTICAL BURST RECEIVER AND METHOD

(75) Inventor: Zhenhong Zhang, Tokyo (JP)

(73) Assignee: NEC Corporation, Tokyo (JP)

( * ) Notice: Subject to any disclaimer, the term of this patent is extended or adjusted under 35 U.S.C. 154(b) by 482 days.

(21) Appl. No.: 12/363,836

(22) Filed: Feb. 2, 2009

(65) Prior Publication Data

US 2009/0196632 A1   Aug. 6, 2009

(30) Foreign Application Priority Data

Feb. 4, 2008   (JP) ................. 2008-023701

(51) Int. Cl.
 H04B 10/06 (2006.01)
 H04B 10/20 (2006.01)
 H04B 10/00 (2006.01)
 H04L 25/06 (2006.01)
(52) U.S. Cl. ........... 398/202; 398/58; 398/135; 375/319
(58) Field of Classification Search ........................ None
 See application file for complete search history.

(56) References Cited

U.S. PATENT DOCUMENTS 6,115,163 A *  9/2000  Nobuhara .................. 398/210
7,889,815 B2 *  2/2011  Miremadi et al. ........... 375/317

FOREIGN PATENT DOCUMENTS

| EP | 1006653 A2 * | 6/2000 |
| EP | 1357717 A1 * | 10/2003 |
| JP | 2004343247 A | 12/2004 |

* cited by examiner

*Primary Examiner* — Kennneth N Vanderpuye
*Assistant Examiner* — Abbas H Alagheband

(57) ABSTRACT

The present invention allows a configuration with elements inside the LSI, the elimination of manpower by using automatic adjustment, a reduction in the manufacturing cost, and control of the duty ratio in a wide temperature range and a wide dynamic range and includes: a TIA that converts an optical burst signal from a current signal to a voltage signal and that outputs the voltage signal as a differential signal; a peak detection/adder circuit that detects a peaking preamble signal of the differential signal, sets the peaking level to a normal phase and a reversed phase, and adjusts an offset signal; an ATCBUFFER that controls the duty ratio of the output signal by a threshold voltage; a duty detection circuit that detects the duty ratio from a burst signal; a threshold voltage adjustment circuit that adjusts the duty ratio by a new threshold voltage in accordance with the size of the voltage signal corresponding to the duty ratio; and a reset control circuit that can detect a burst signal of the duty detection circuit by a reset signal that confirms the arrival of the burst signal.

7 Claims, 7 Drawing Sheets

100: OPTICAL BURST RECEIVER
142: ADDER CIRCUIT

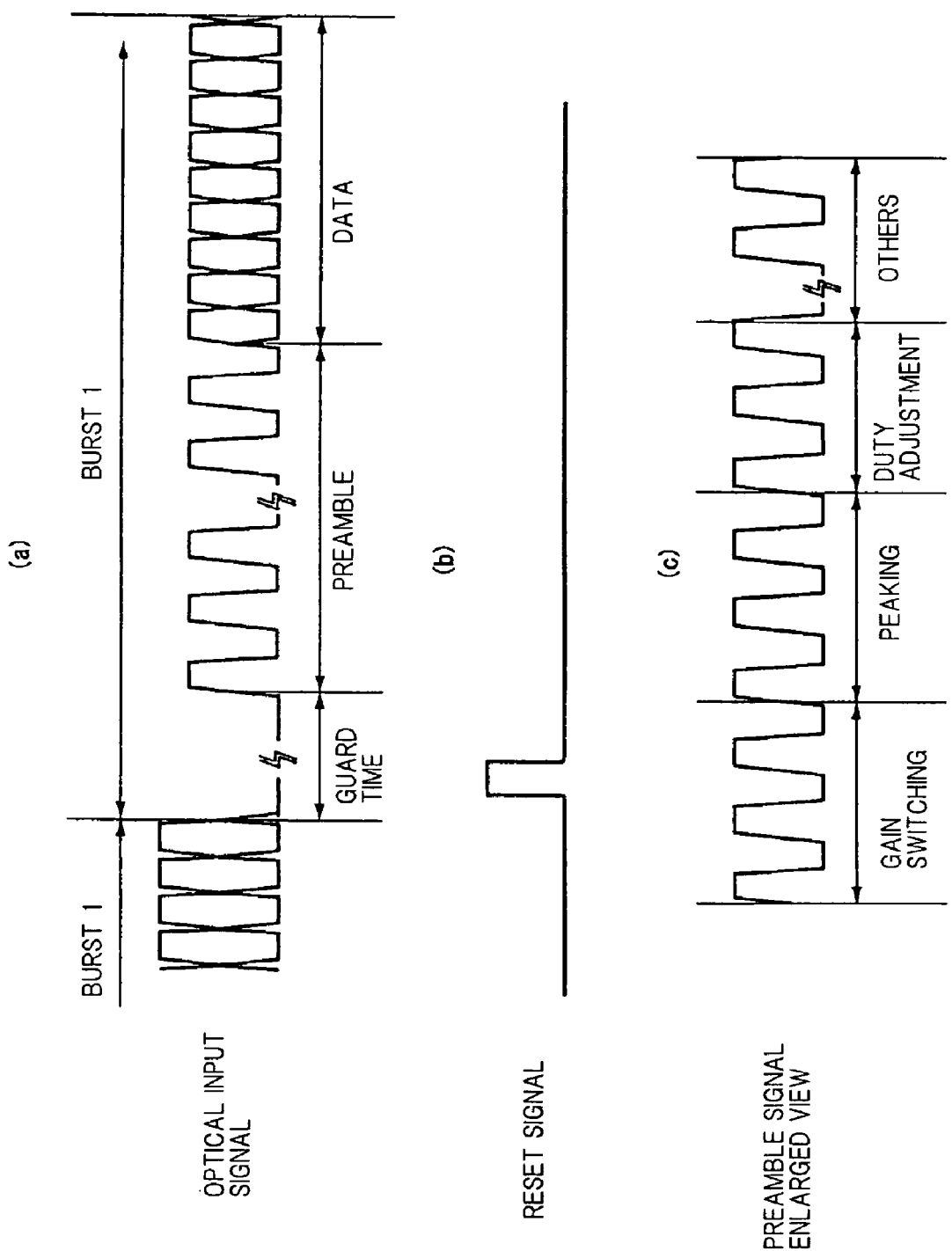

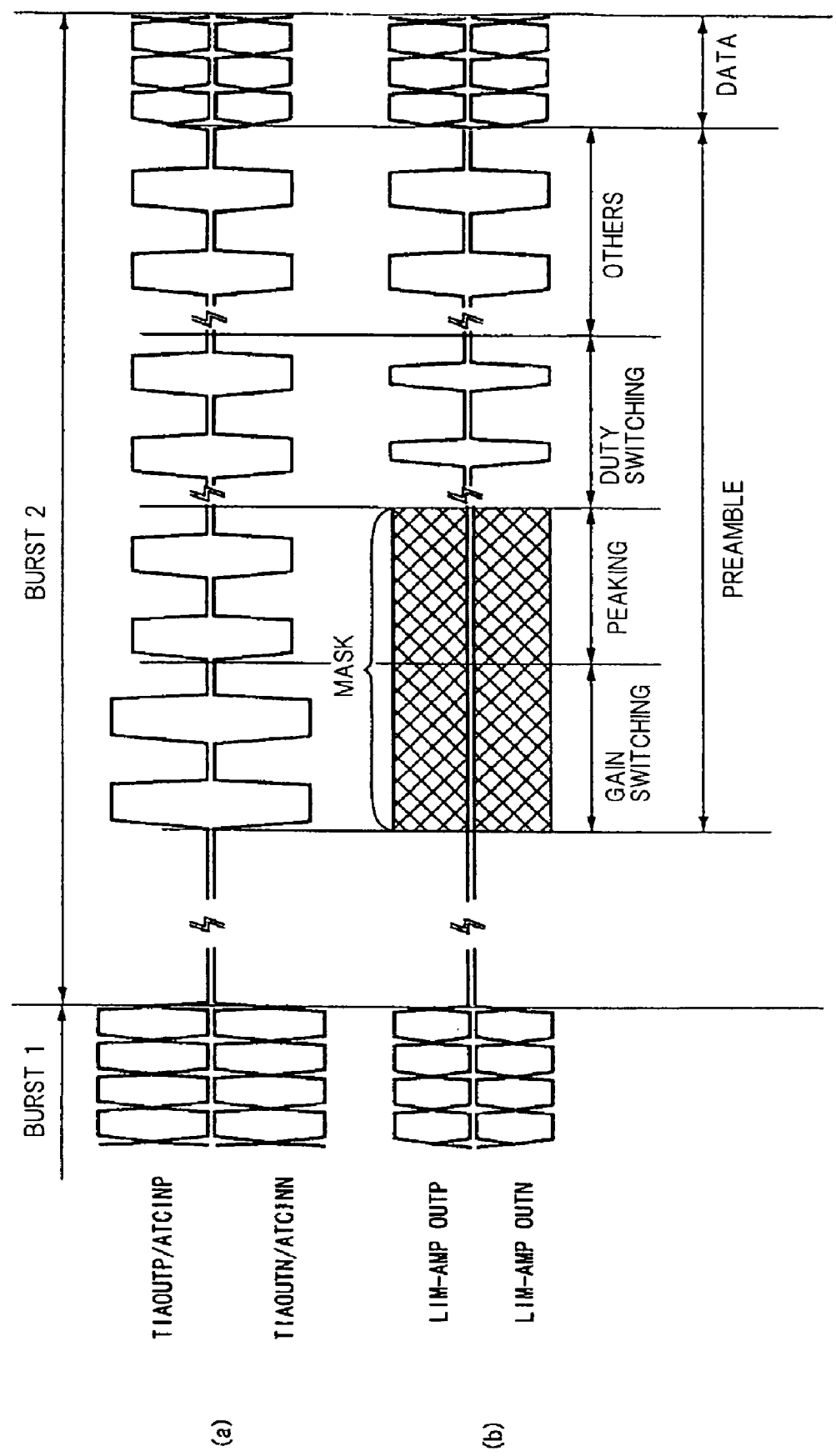

Fig.4

RELATIONSHIP EXAMPLE OF DUTY DETECTION LEVEL AND OUTPUT LEVEL OF COMPARATORS 1 TO 16

| DUTY DETECTION LEVEL [mV] | COMPARATOR 201 OUTPUT | COMPARATOR 202 OUTPUT | COMPARATOR 203 OUTPUT | COMPARATOR 204 OUTPUT | COMPARATOR 205 OUTPUT | COMPARATOR 206 OUTPUT | COMPARATOR 207 OUTPUT | COMPARATOR 208 OUTPUT | COMPARATOR 209 OUTPUT | COMPARATOR 210 OUTPUT | COMPARATOR 211 OUTPUT | COMPARATOR 212 OUTPUT | COMPARATOR 213 OUTPUT | COMPARATOR 214 OUTPUT | COMPARATOR 215 OUTPUT | COMPARATOR 216 OUTPUT |
|---|---|---|---|---|---|---|---|---|---|---|---|---|---|---|---|---|
| 160以下 | LOW | LOW | LOW | LOW | LOW | LOW | LOW | LOW | LOW | LOW | LOW | LOW | LOW | LOW | LOW | LOW |
| 160~320 | HIGH | LOW | LOW | LOW | LOW | LOW | LOW | LOW | LOW | LOW | LOW | LOW | LOW | LOW | LOW | LOW |
| 320~480 | HIGH | HIGH | LOW | LOW | LOW | LOW | LOW | LOW | LOW | LOW | LOW | LOW | LOW | LOW | LOW | LOW |
| 480~640 | HIGH | HIGH | HIGH | LOW | LOW | LOW | LOW | LOW | LOW | LOW | LOW | LOW | LOW | LOW | LOW | LOW |
| 640~800 | HIGH | HIGH | HIGH | HIGH | LOW | LOW | LOW | LOW | LOW | LOW | LOW | LOW | LOW | LOW | LOW | LOW |
| 800~960 | HIGH | HIGH | HIGH | HIGH | HIGH | LOW | LOW | LOW | LOW | LOW | LOW | LOW | LOW | LOW | LOW | LOW |
| 960~640 | HIGH | HIGH | HIGH | HIGH | HIGH | HIGH | LOW | LOW | LOW | LOW | LOW | LOW | LOW | LOW | LOW | LOW |
| 1120~1280 | HIGH | HIGH | HIGH | HIGH | HIGH | HIGH | HIGH | LOW | LOW | LOW | LOW | LOW | LOW | LOW | LOW | LOW |
| 1280~1440 | HIGH | HIGH | HIGH | HIGH | HIGH | HIGH | HIGH | HIGH | LOW | LOW | LOW | LOW | LOW | LOW | LOW | LOW |
| 1440~1600 | HIGH | HIGH | HIGH | HIGH | HIGH | HIGH | HIGH | HIGH | HIGH | LOW | LOW | LOW | LOW | LOW | LOW | LOW |
| 1600~1760 | HIGH | HIGH | HIGH | HIGH | HIGH | HIGH | HIGH | HIGH | HIGH | HIGH | LOW | LOW | LOW | LOW | LOW | LOW |
| 1760~1920 | HIGH | HIGH | HIGH | HIGH | HIGH | HIGH | HIGH | HIGH | HIGH | HIGH | HIGH | LOW | LOW | LOW | LOW | LOW |
| 1920~2080 | HIGH | HIGH | HIGH | HIGH | HIGH | HIGH | HIGH | HIGH | HIGH | HIGH | HIGH | HIGH | LOW | LOW | LOW | LOW |
| 2080~2240 | HIGH | HIGH | HIGH | HIGH | HIGH | HIGH | HIGH | HIGH | HIGH | HIGH | HIGH | HIGH | HIGH | LOW | LOW | LOW |
| 2240~2400 | HIGH | HIGH | HIGH | HIGH | HIGH | HIGH | HIGH | HIGH | HIGH | HIGH | HIGH | HIGH | HIGH | HIGH | LOW | LOW |
| 2400~2560 | HIGH | HIGH | HIGH | HIGH | HIGH | HIGH | HIGH | HIGH | HIGH | HIGH | HIGH | HIGH | HIGH | HIGH | HIGH | LOW |
| 2560以上 | HIGH | HIGH | HIGH | HIGH | HIGH | HIGH | HIGH | HIGH | HIGH | HIGH | HIGH | HIGH | HIGH | HIGH | HIGH | HIGH |

Fig.6

OPERATIONAL RELATIONSHIP EXAMPLE OF SW 1 TO 16 AND THRESHOLD VOLTAGE

| THRESHOLD VOLTAGE [Mv] | SW301 | SW302 | SW303 | SW304 | SW305 | SW306 | SW307 | SW308 | SW309 | SW310 | SW311 | SW312 | SW313 | SW314 | SW315 | SW316 |
|---|---|---|---|---|---|---|---|---|---|---|---|---|---|---|---|---|
| 2720 | ON | ON | ON | ON | ON | ON | ON | ON | OFF | OFF | OFF | OFF | OFF | OFF | OFF | OFF |
| 2560 | OFF | ON | ON | ON | ON | ON | ON | ON | OFF | OFF | OFF | OFF | OFF | OFF | OFF | OFF |
| 2400 | OFF | OFF | ON | ON | ON | ON | ON | ON | OFF | OFF | OFF | OFF | OFF | OFF | OFF | OFF |
| 2240 | OFF | OFF | OFF | ON | ON | ON | ON | ON | OFF | OFF | OFF | OFF | OFF | OFF | OFF | OFF |
| 2080 | OFF | OFF | OFF | OFF | ON | ON | ON | ON | OFF | OFF | OFF | OFF | OFF | OFF | OFF | OFF |
| 1920 | OFF | OFF | OFF | OFF | OFF | ON | ON | ON | OFF | OFF | OFF | OFF | OFF | OFF | OFF | OFF |
| 1760 | OFF | OFF | OFF | OFF | OFF | OFF | ON | ON | OFF | OFF | OFF | OFF | OFF | OFF | OFF | OFF |
| 1600 | OFF | OFF | OFF | OFF | OFF | OFF | OFF | ON | OFF | OFF | OFF | OFF | OFF | OFF | OFF | OFF |
| 1440 | OFF | OFF | OFF | OFF | OFF | OFF | OFF | OFF | ON | OFF | OFF | OFF | OFF | OFF | OFF | OFF |
| 1280 | OFF | OFF | OFF | OFF | OFF | OFF | OFF | OFF | ON | ON | OFF | OFF | OFF | OFF | OFF | OFF |
| 1120 | OFF | OFF | OFF | OFF | OFF | OFF | OFF | OFF | ON | ON | ON | OFF | OFF | OFF | OFF | OFF |
| 960 | OFF | OFF | OFF | OFF | OFF | OFF | OFF | OFF | ON | ON | ON | ON | OFF | OFF | OFF | OFF |
| 800 | OFF | OFF | OFF | OFF | OFF | OFF | OFF | OFF | ON | ON | ON | ON | ON | OFF | OFF | OFF |
| 640 | OFF | OFF | OFF | OFF | OFF | OFF | OFF | OFF | ON | ON | ON | ON | ON | ON | OFF | OFF |
| 480 | OFF | OFF | OFF | OFF | OFF | OFF | OFF | OFF | ON | ON | ON | ON | ON | ON | ON | OFF |
| 320 | OFF | OFF | OFF | OFF | OFF | OFF | OFF | OFF | ON | ON | ON | ON | ON | ON | ON | OFF |
| 160 | OFF | OFF | OFF | OFF | OFF | OFF | OFF | OFF | ON | ON | ON | ON | ON | ON | ON | ON |

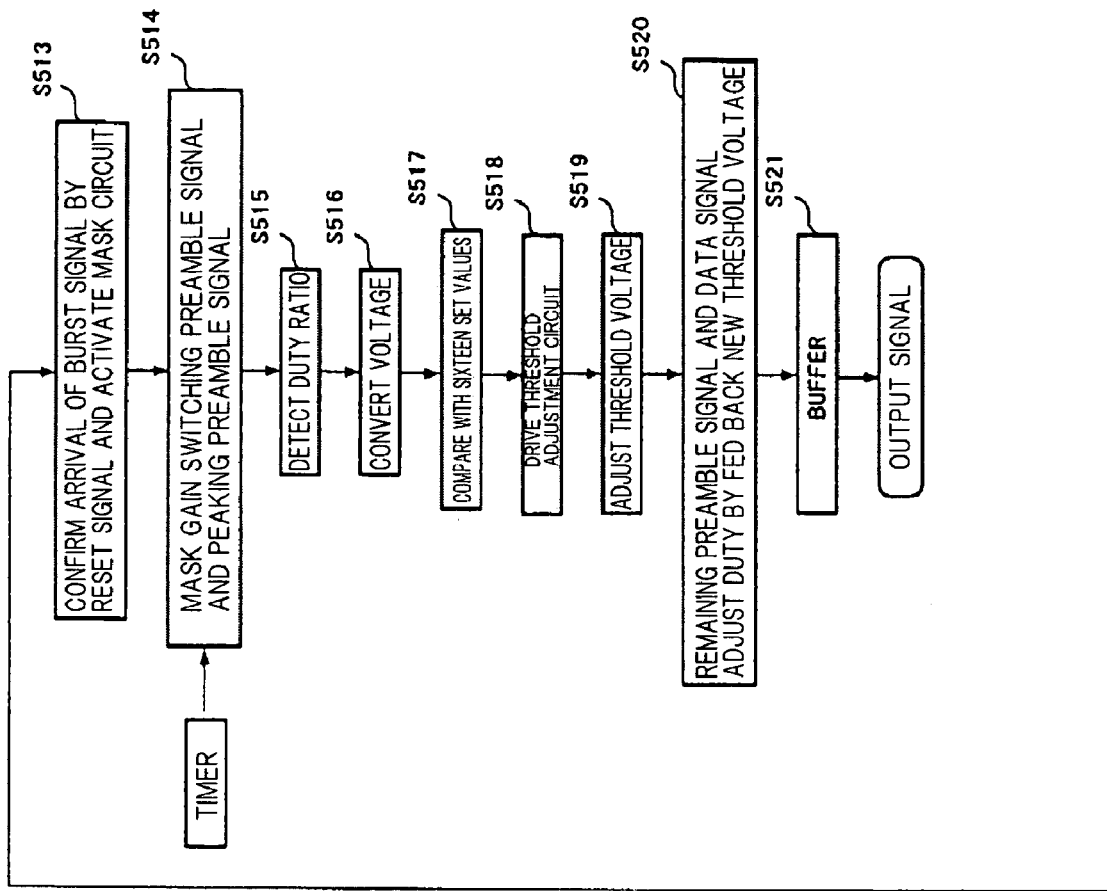
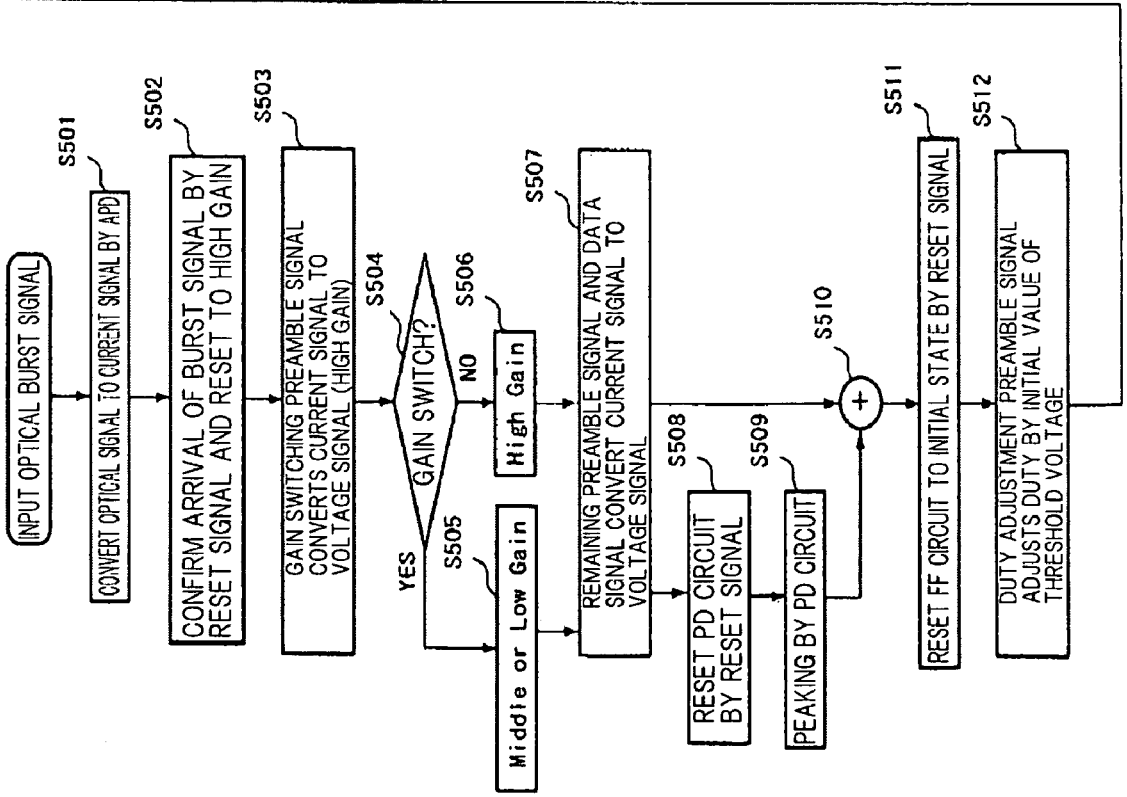
Fig.7

OPTICAL BURST RECEIVER AND METHOD

This application is based upon and claims the benefit of priority from Japanese patent application No. 2008-023701, filed on Feb. 4, 2008, the disclosure of which is incorporated herein in its entirety by reference.

BACKGROUND OF THE INVENTION

1. Field of the Invention

The present invention relates to an optical burst receiver that adjusts the duty of an output signal. In particular, the present invention relates to an optical burst receiver and method capable of reducing the number of components and manpower in the duty adjustment of an output signal.

2. Description of the Related Art

External components other than the LSI (large scale integration) are attached to an optical burst receiver for manual adjustment in order to stably adjust the duty ratio (Duty) of an output signal without depending on the temperature and the optical input power.

A first problem in such an optical burst receiver is that since external components other than the LSI are required, the area where the external components are to be mounted needs to be large, and the miniaturization of the optical burst receiver is difficult.

A second problem is that much manpower is required for manual adjustment, and the cost of the optical burst receiver is high.

A technique related to the optical burst receiver for duty adjustment is described in Japanese Patent Laid-Open No. 2004-343247.

The technique described in Japanese Patent Laid-Open No. 2004-343247 is for correcting the duty ratio of a received signal to 50% to allow accurate identification and reproduction of an electrical signal in a compact and low-cost system.

An opto-electrical converter/amplifier converts an input optical signal to an electrical signal and transmits the electrical signal to a differential wideband amplifier and a trigger generator. The trigger generator generates a trigger signal and transmits the trigger signal to a duty ratio correction circuit.

The differential wideband amplifier transmits an output signal to an identifier/reproducer, the duty ratio correction circuit, and a clock generator. Based on the output signals of the trigger generator and the differential wideband amplifier, the duty ratio correction circuit generates a control signal for correcting the duty ratio of the output signal of the differential wideband amplifier and transmits the control signal to the differential wideband amplifier.

The clock generator generates a clock signal and transmits the clock signal to the identifier/reproducer. Based on the clock signal, the identifier/reproducer identifies and reproduces the signal transmitted from the differential wideband amplifier.

Control is performed based on the duty in a preamble pattern in the technique described in Japanese Patent Laid-Open No. 2004-343247. However, there is a problem in that the technique is not sufficient for further controlling the duty ratio in which a plurality of pieces of control information are included in the preamble signal.

SUMMARY OF THE INVENTION

The present invention has been made in view of the forgoing problems, and an object of the present invention is to provide an optical burst receiver and method capable of including a plurality of pieces of control information in the preamble, the receiver being made up only of the elements inside the LSI, the receiver being manually operable, while eliminating the use of external adjustment components, and in which the number of components is reduced, the need to use manpower is eliminated by using automatic adjustment, the manufacturing cost is reduced and ratio correction circuit is controllable over a wide temperature range and a wide dynamic range.

To solve the problems, the present invention provides an optical burst receiver that converts an optical burst signal from a current signal to a voltage signal to receive: a burst signal; an optical burst signal including a guard time, a preamble signal including a gain switching preamble signal, a peaking preamble signal, and a duty adjustment preamble signal; and a data signal, the optical burst receiver comprising:

a transimpedance amplifier that converts the optical burst signal from a current signal to a voltage signal, controls the gain of the preamble signal including the peaking preamble signal and the duty adjustment preamble signal and the data signal according to a voltage level of the gain switching preamble signal, and outputs a differential signal;

a peaking/adder circuit that detects the peaking preamble signal of the differential signal from the transimpedance amplifier, sets the peaking to a normal phase and a reversed phase, and adjusts an offset signal of the preamble signal including the gain switching preamble signal and the duty adjustment preamble signal and the data signal;

an automatic threshold control buffer circuit that controls the duty ratio of an output signal from the peaking/adder circuit by a threshold voltage;

a duty detection circuit that detects a burst signal outputted from the automatic threshold control buffer circuit, masks the gain switching preamble signal and the peaking preamble signal in the preamble signal included in the detected burst signal, detects the duty ratio of a duty switching preamble signal, and converts the burst signal to a voltage signal corresponding to the duty ratio;

a threshold voltage adjustment circuit that adjusts the duty of the gain switching preamble signal, the peaking preamble signal, and the data signal for the automatic threshold control buffer circuit by a new threshold voltage in accordance with the size of the voltage signal from the duty detection circuit; and the reset control circuit that can output a reset signal that confirms the arrival of the burst signal, set the transimpedance amplifier to an initial gain using the reset signal, reset the peaking of the peaking/adder circuit, and detect the burst signal of the duty detection circuit.

The width of the reset signal from the reset control circuit is smaller than the width of the guard time, and the timing of the reset signal is adjusted so as to fall within the range of the guard time.

The threshold voltage adjustment circuit includes: switches that are subjected to on/off control through flip-flop circuits by a High/Low signal obtained by comparing the voltage signal from the duty detection circuit and set voltages; and resistors that form a threshold voltage by on/off of the switches.

The flip-flop circuits are reset to initial values by the reset signal from the reset control circuit.

The switches are constituted by MOS-FET.

A gain control circuit, which switches the gain into three values by input/output power, is connected in parallel with the transimpedance amplifier that converts the optical burst signal from a current signal to a voltage signal, the arrival of the burst signal is confirmed by the reset signal from the reset control circuit, and the gain of the gain control circuit is reset.

Furthermore, the present invention provides an optical burst receiving method of converting an optical burst signal from a current signal to a voltage signal to receive: a burst signal; an optical burst signal including a guard time, a preamble signal including a gain switching preamble signal, a peaking preamble signal, and a duty adjustment preamble signal; and a data signal, the optical burst receiving method comprising:

converting the optical burst signal from a current signal to a voltage signal, setting an initial gain by a reset signal that confirms the arrival of the burst signal, controlling the gain of the preamble signal including the peaking preamble signal and the duty adjustment preamble signal and the data signal according to a voltage level of the gain switching preamble signal, and outputting a differential signal;

resetting the peaking of the differential signal by the reset signal that confirms the arrival of the burst signal, detecting the peaking preamble signal, setting the peaking to a normal phase and a reversed phase, and outputting a voltage signal, in which an offset signal of the preamble signal including the gain switching preamble signal and the duty adjustment preamble signal and the data signal are adjusted;

outputting a voltage signal, in which the duty ratio is controlled by a threshold voltage, to the voltage signal, in which the offset signal is adjusted;

detecting a burst signal from the voltage signal in which the duty ratio is controlled by the reset signal that confirms the arrival of the burst signal, masking the gain switching preamble signal and the peaking preamble signal in the preamble signal included in the detected burst signal, detecting the duty ratio of a duty switching preamble signal, and converting the bust signal to a voltage signal corresponding to the duty ratio; and adjusting the duty of the gain switching preamble signal, the peaking preamble signal, and the data signal by a new threshold voltage in accordance with the size of the voltage signal corresponding to the duty ratio.

BRIEF DESCRIPTION OF THE DRAWINGS

FIG. 2 is an explanatory view of an optical input signal inputted to light receiving element 110 in FIG. 1;

FIG. 3 depicts an output waveform example of TIA circuit 120 and a waveform example of LIM-AMP 150 in FIG. 1;

FIG. 4 is an explanatory view of a relationship example of duty detection levels of duty detection circuit 173 and output levels of sixteen comparators 201 to 216 in FIG. 1;

FIG. 6 is an explanatory view of an operational relationship example of switches 301 to 316 and threshold voltages in threshold voltage adjustment circuit 180 in FIG. 5; and FIG. 7 is a flow chart for explaining an example of a series of operations of the optical burst receiver in FIG. 1.

EXEMPLARY EMBODIMENT

An exemplary embodiment will now be described with reference to the drawings.

Figure 1:
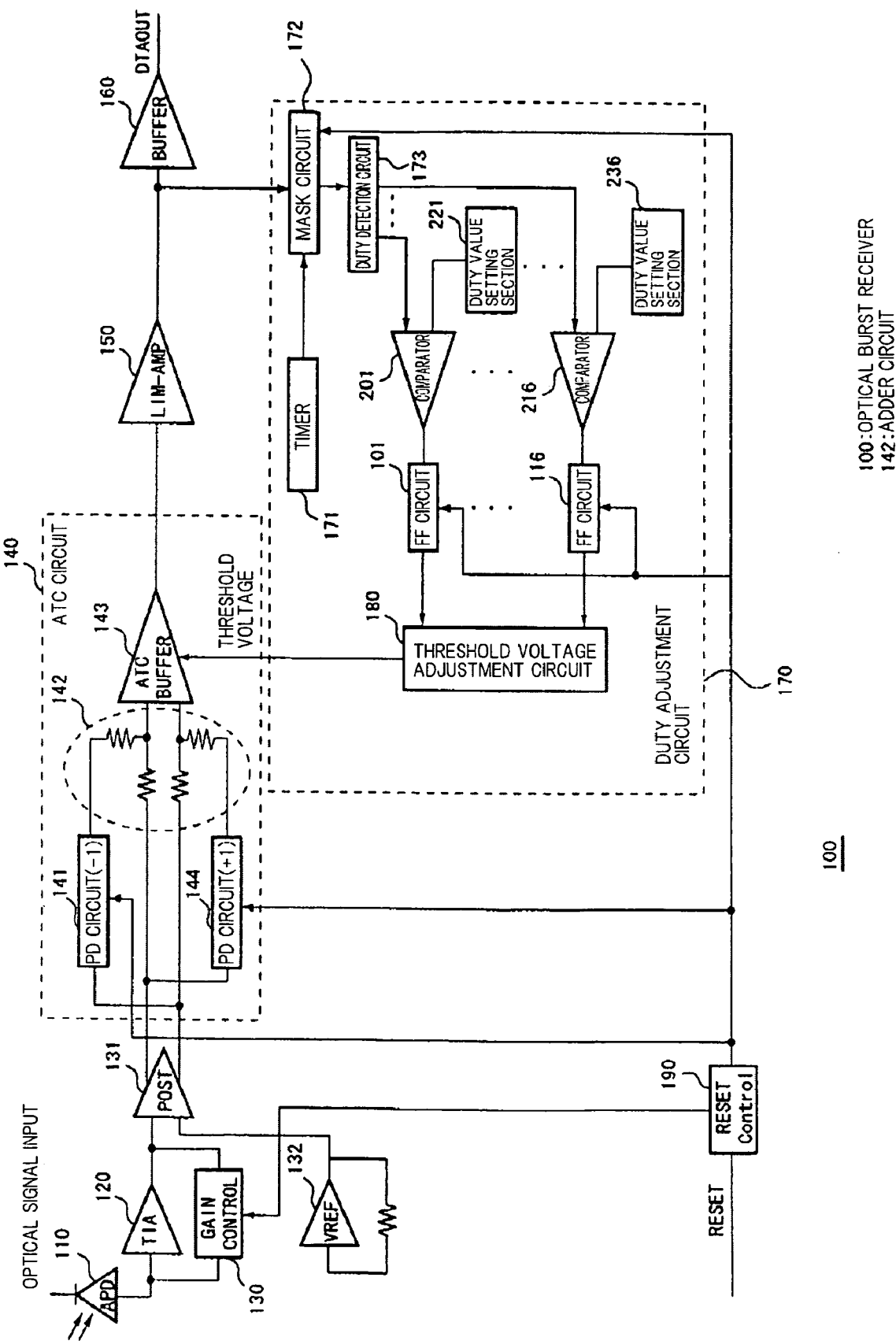
FIG. 1 is a block diagram of a schematic configuration of an optical burst receiver according to the present invention.

FIG. 1 is a block diagram of a schematic configuration of an optical burst receiver according to the present invention. As shown in FIG. 1, optical burst receiver 100, in which a downstream signal of an access PON (Passive Optical Network) system is formed by the burst of an optical input signal, usually includes light receiving element (APD: avalanche photodiode) 110, TIA circuit (transimpedance amplifier) 120, gain controller (GAIN Control) 130, POST 131, VREF 132, ATC circuit (AUTO THRESHOLD CONTROL: automatic threshold control circuit) 140, LIM-AMP (limiting amplifier) 150, buffer (BUFFER) 160, duty (DUTY) adjustment circuit 170, and reset controller (RESET CONTROL) 190.

ATC circuit 140 includes peak detection (PEAK DETECTOR) circuit (−) 141, peak detection circuit (+) 141, adder circuit 142, and ATC buffer 143.

Duty adjustment circuit 170 includes timer 171, mask circuit 172, duty (DUTY) detector 173, comparators 201-216, duty value setting sections 221 to 236, FF (flip-flop) circuits 101 to 116, and threshold voltage adjustment circuit 180.

Light receiving element 110 is a high-speed/high-sensitivity photodiode in which the photocurrent is doubled by applying reverse bias, and in which an optical signal is converted to an electric current.

TIA circuit 120 is connected to light receiving element 110. TIA circuit 120 is a transimpedance amplifier that converts a current signal to a voltage signal and that can deal with a burst signal.

Gain controller 130 is connected in parallel with light receiving element 110. Gain controller 130 connected to reset controller 190 operates as a feedback resistor of TIA circuit 120 and switches the feedback resistor according to optical input power to switch the gain of TIA circuit 120 into three values of high (High) gain, low (Low) gain, and middle (Middle) gain to secure the dynamic range of the light receiving power.

POST 131 is a buffer and outputs an inputted signal from VREF 132 and TIA circuit 120 to ATC circuit 140 as a differential signal.

VREF 132 is a dummy amplifier that balances the impedance between both terminals of the differential input of POST 131 and outputs a fixed voltage.

In ATC circuit 140, the input and output are in a balanced (differential) form, and normal-phase peak detection circuit (+1) 144 and reversed-phase peak detection circuit (−1) 141 are set on the input side of ATC buffer 143. Adder circuit 142 is further set in ATC circuit 140 to reduce common mode noise.

Peak detection circuit (+1) 144 and peak detection circuit (−1) 141 are designed to detect the peaks of a normal phase and a reversed phase, respectively, and reset controller 190 is connected. Peak detection circuit (+1) 144 and peak detection circuit (−1) 141 also include offset cancel functions for cancelling offsets.

The duty of an output waveform of ATC circuit 140 is adjusted by a threshold voltage of ATC buffer 143.

LIM-AMP 150 and duty adjustment circuit 170 are connected to ATC circuit 140, and buffer 160 is connected to LIM-AMP 150.

Mask circuit 172 of duty adjustment circuit 170 is connected to the output side of LIM-AMP 150, and mask circuit 172 masks unnecessary bits using timer 171.

Duty detection circuit 173 is connected to mask circuit 172, and duty detection circuit 173 detects the duty ratio of an output signal of LIM-AMP 150 and further converts the detected duty ratio to a voltage signal.

Sixteen comparators 201 to 216 are connected to duty detection circuit 173. Sixteen duty value setting sections 221 to 236 are connected to sixteen comparators 201 to 216, respectively. Sixteen duty value setting sections 221 to 236 output and set voltages v1, v2, . . . , and v16 to sixteen comparators 201 to 216, respectively. The set voltages of sixteen duty value setting sections 221 to 236 are in a relationship of v1<v2< . . . <v16.

Sixteen comparators 201 to 216 compare the voltage signal corresponding to the duty ratio converted in duty detection circuit 173 and the set voltages from sixteen duty value setting sections 221 to 236 and output a High/Low signal as a comparison result.

Threshold voltage adjustment circuit 180 is connected to sixteen comparators 201 to 216 through sixteen FF circuits 101 to 116. Threshold voltage adjustment circuit 180 is driven by the High/Low signal from sixteen FF circuits 101 to 116 to adjust a threshold voltage. The adjusted threshold voltage adjusts the duty of an output waveform of ATC buffer 143 of ATC circuit 140.

In this way, it is possible for the receiver to be constructed only of elements that are inside the LSI (large scale integration), external adjustment components are not required while the receiver can be operated manually, the number of components can be reduced, and the size of the area for mounting components can be reduced.

FIG. 2 is an explanatory view of an optical input signal inputted to light receiving element 110 in FIG. 1. As shown in FIG. 2(A), the bursts of the optical input signal inputted to light receiving element 110 include a guard time, a preamble signal, and a data signal.

As shown in FIG. 2(B), a reset signal outputted by reset controller 190 is needed for each burst signal. The width of the reset signal is smaller than the width of the guard time, and the timing is adjusted so as to fall within the range of the guard time.

As shown in an enlarged view of the preamble signal of FIG. 2(C), the preamble signal is an NRZ (Non Return to Zero) fixed pattern and is divided into four sections: gain switching, peaking, duty adjustment, and other preamble signals.

FIG. 3 depicts an output waveform example of TIA circuit 120 and a waveform example of LIM-AMP 150 in FIG. 1.

Waveforms TIAOUTP/ATCINP and TIAOUTN/ATCINN shown in FIG. 3(A) indicate voltage waveforms outputted by TIA circuit 120 after receiving an output current from light receiving element 110.

The waveform of the gain switching preamble signal is converted with High gain, and the waveforms of the subsequent preamble signal and data signal are converted with a selected gain based on the input power of gain controller 130.

The Peaking, duty switching, other preamble signals, and data signal in the waveforms of TIAOUTP/ATCINP and TIAOUTN/ATCINN are examples of output voltage waveforms of TIA circuit 120 controlled by Low gain.

Waveforms of LIM-AMP OUTP and LIM-AMP OUTN shown in FIG. 3(B) are examples of output burst waveforms from LIM-AMP 150 in which the duty of the waveform is adjusted by duty adjustment circuit 170 through ATC circuit 140.

Duty adjustment circuit 170 adjusts gain switching, peaking, and duty adjustment preamble signals with an initial value of the threshold voltage.

Duty adjustment circuit 170 detects the duty ratio of the duty adjustment preamble signal and compares the duty ratio with a set value to readjust the duty of the output waveform.

The other preamble signals and data signal in the waveforms of LIM-AMP OUTP and LIM-AMP OUTN are output waveforms in which the duty is readjusted.

Figure 5:
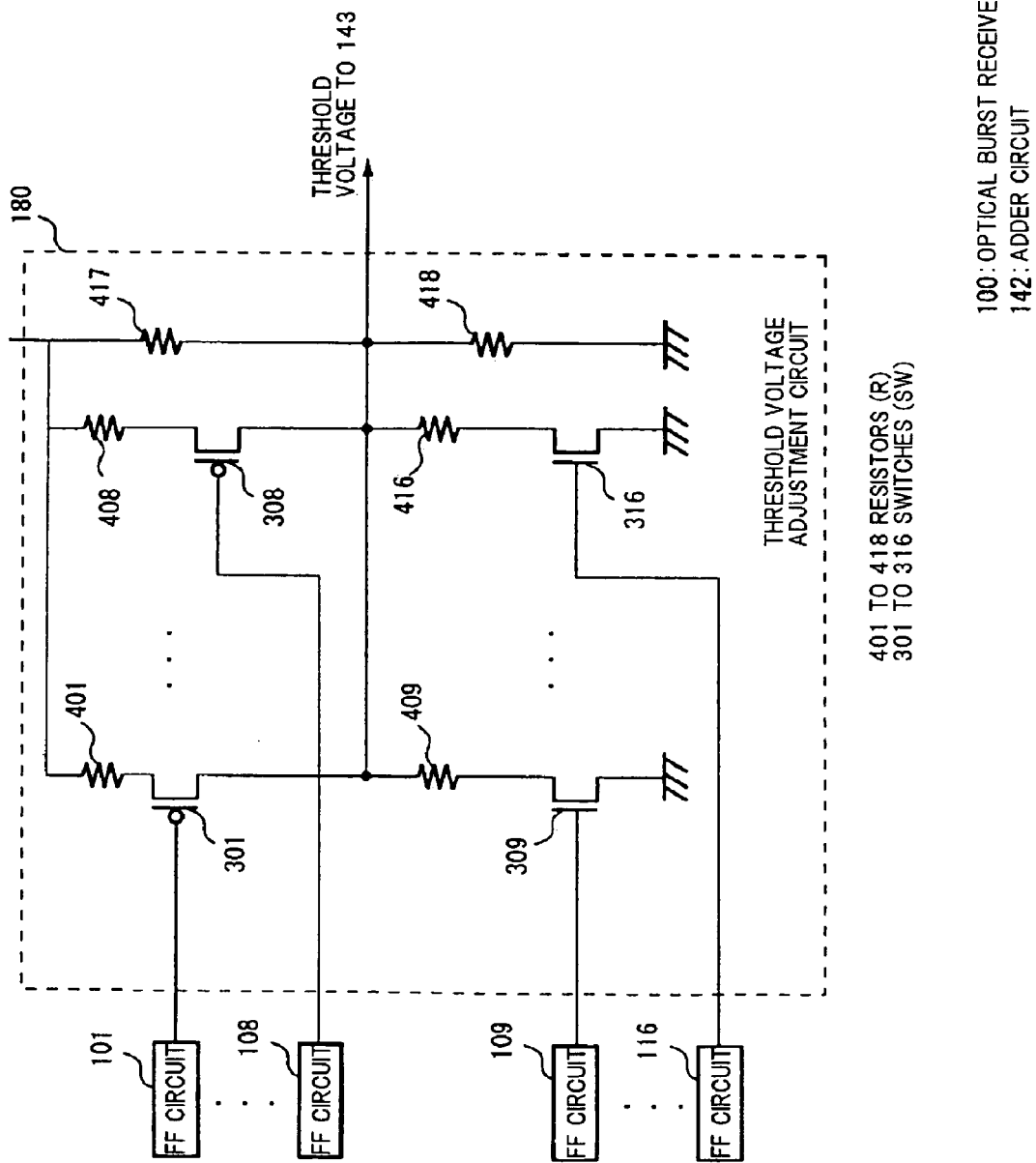
FIG. 5 depicts a circuit of a schematic configuration of threshold voltage adjustment circuit 180 in FIG. 1.

FIG. 4 is an explanatory view of a relationship example of duty detection levels of duty detection circuit 173 and output levels of sixteen comparators 201 to 216 in FIG. 1. FIG. 5 depicts a circuit of a schematic configuration of threshold voltage adjustment circuit 180 in FIG. 1.

In an example of FIG. 4, set voltages v1, v2, . . . , and v16 of sixteen duty value setting sections 221 to 236 are set to sixteen voltages v1=160 mV, v2=320 mV, . . . , v15=2400 mV, and v16=2560 mV, and the intervals are 160 mV.

As shown in FIG. 4, every time the duty detection level of duty detection circuit 173 increases by 160 mV, the number of comparators 201 to 216 with High output increases by one, and the number of comparators 201 to 216 with Low output decreases by one.

Sixteen FF circuits 101 to 116 are connected to sixteen comparators 201 to 216 on the output side, respectively, and threshold voltage adjustment circuit 180 is connected through sixteen FF circuits 101 to 116. Threshold voltage adjustment circuit 180 is driven by a High/Low signal from sixteen comparators 201 to 216.

The output of sixteen FF circuits 101 to 116 is High when the output of sixteen comparators 201 to 216 is High, and the output of FF circuits 101 to 116 is Low when the output of sixteen comparators 201 to 216 is Low.

Thus, threshold voltage adjustment circuit 180 uses the High/Low signal from sixteen FF circuits 101 to 116 to adjust the threshold voltage.

Threshold voltage adjustment circuit 180 is connected to ATC buffer 143 of ATC circuit 140 and adjusts the duty ratio of the output waveform of ATC buffer 143 through ATC buffer 143 based on the adjusted threshold voltage.

A detailed configuration of threshold voltage adjustment circuit 180 will now be described. Threshold voltage adjustment circuit 180 is realized by, for example, a combination of resistors and MOS (metal oxide semiconductor) FET (field effect transistor) switches, as described below.

As shown in FIG. 5, threshold voltage adjustment circuit 180 includes eighteen resistors 401 to 418 and sixteen MOS-FET switches 301 to 316.

Switches 301 to 308 are OFF when the output of FFs 101 to 108 is High, and switches 301 to 308 are ON when the output of FFs 101 to 108 is Low.

Switches 309 to 316 are ON when the output of FFs 109 to 116 is High, and switches 309 to 316 are OFF when the output of FFs 109 to 116 is Low.

FIG. 6 is an explanatory view of an operational relationship example of switches 301 to 316 and threshold voltages in threshold voltage adjustment circuit 180 in FIG. 5. As shown in FIG. 6, combinations of ON/OFF of switches 301 to 316 can supply seventeen threshold voltages. For example, the threshold voltages are 160 mV, 320 mV, . . . , 2400 mV, 2560 mV, and 2720 mV, and the intervals are 160 mV.

FIG. 7 is a flow chart for explaining an example of a series of operations of the optical burst receiver in FIG. 1. As shown in FIG. 7, when an optical burst signal is inputted to light receiving element (APD) 110, light receiving element 110 converts the optical input signal to an electrical current signal in step S501, and TIA circuit 120 imports the converted current signal.

In step S502, gain controller 130 confirms the arrival of a burst signal by a reset signal from reset controller 190 and sets TIA circuit 120 to High gain that is an initial gain.

In step S503, TIA circuit 120 converts the gain switching preamble signal from a current signal to a voltage signal with High gain.

In steps S504, 505, and 506, gain controller 130 detects the voltage level of the gain preamble signal by feedback, compares the voltage level with the set value, determines one from among High gain, Low gain, and Middle gain, and selects the gain (feedback resistor) of TIA circuit 120.

In step S507, TIA circuit 120 converts the remaining preamble signal (peaking, duty switching, and other preamble signals) and the data signal of the input signal from a current signal to a voltage signal with a selected gain, and POST 131 outputs a differential signal. In this way, a dynamic range can be secured.

In step S508, peak detection circuit (+) 144 and peak detection circuit (−) 141 first confirm the arrival of the burst signal by the reset signal from reset controller 190 and reset the peaking level of peak detection circuit (+) 144 and peak detection circuit (−) 141.

In step S509, peak detection circuit (+) 144 and peak detection circuit (−) 141 then execute a peaking operation.

In step S510, adder circuit 142 adjusts an offset signal of the remaining preamble signal and the data signal of the input signal based on a peaking level from peak detection circuit (+) 144 and peak detection circuit (−) 141. ATC buffer 143 143 imports the adjusted signal.

In step S511, sixteen FF (flip-flop) circuits 101 to 116 are first reset to an initial state by a reset signal from reset controller 190.

In step S512, ATC buffer 143 adjusts the duty ratio of the duty adjustment preamble signal with the initial value of the threshold voltage from threshold voltage adjustment circuit 180.

In step S513, mask circuit 172 first activates mask circuit 172 by the reset signal from reset controller 190, detects the burst signal from LIM-AMP 150, and confirms the arrival of the burst signal.

In step S514, timer 171 masks the gain switching preamble signal and the peaking preamble signal in the detected burst signal.

In step S515, duty detection circuit 173 then detects the duty ratio of a duty detection preamble signal.

In step S516, the detected duty ratio is converted to a voltage. In this way, the accuracy and stability of the duty ratio is improved.

In step S517, sixteen comparators 201 to 216 compare the voltage from duty detection circuit 173 and the set values from sixteen duty value setting sections 221 to 236 and output a High/Low signal.

In step S518, sixteen FF circuits 101 to 116 drive threshold voltage adjustment circuit 180 using the High/Low signal from sixteen comparators 201 to 216.

In step S519, the threshold voltage of ATC buffer 143 is adjusted.

In step S520, ATC buffer 143 adjusts the duty ratio of the remaining preamble signal (gain switching, peaking, and other preamble signals) and the data with a new threshold voltage from threshold voltage adjustment circuit 180. In this way, the feedback can improve the stability.

In step S521, the burst signal with adjusted duty ratio is outputted to LIM-AMP 150, and buffer 160 through-outputs the burst signal from LIM-AMP 150.

The above described exemplary embodiment allows a configuration of a receiver constructed only of elements inside the LSI (large scale integration), thereby eliminating the need for external adjustment components while the receiver is manually operable, reducing the number of components and reducing the size of area where components are mounted.

Furthermore, the automatic adjustment allows the elimination of manpower and a reduction in the manufacturing cost.

Furthermore, the feedback system allows the use of the receiver in a wide temperature range and a wide dynamic range.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical burst receiver that converts an optical burst signal from a current signal to a voltage signal to receive: a burst signal; an optical burst signal including a guard time, a preamble signal including a gain switching preamble signal, a peaking preamble signal, and a duty adjustment preamble signal; and a data signal, the optical burst receiver comprising:
   a transimpedance amplifier that converts the optical burst signal from a current signal to a voltage signal, controls the gain of the preamble signal including the peaking preamble signal and the duty adjustment preamble signal and the data signal according to a voltage level of the gain switching preamble signal, and outputs a differential signal;
   a peaking/adder circuit that detects the peaking preamble signal of the differential signal from the transimpedance amplifier, sets the peaking level to a normal phase and a reversed phase, and adjusts an offset signal of the preamble signal including the gain switching preamble signal and the duty adjustment preamble signal and the data signal;
   an automatic threshold control buffer circuit that controls the duty of an output signal from the peaking/adder circuit by a threshold voltage;
   a duty detection circuit that detects a burst signal outputted from the automatic threshold control buffer circuit, masks the gain switching preamble signal and the peaking preamble signal in the preamble signal included in the detected burst signal, detects the duty ratio of a duty switching preamble signal, and converts the burst signal to a voltage signal corresponding to the duty ratio;
   a threshold voltage adjustment circuit that adjusts the duty ratio of the gain switching preamble signal, the peaking preamble signal, and the data signal for the automatic threshold control buffer circuit by a new threshold voltage in accordance with the size of the voltage signal corresponding to the duty ratio from the duty detection circuit; and
   the reset control circuit that can output a reset signal that confirms the arrival of the burst signal, set the transimpedance amplifier to an initial gain by the reset signal, reset the peaking level of the peaking/adder circuit, and detect the burst signal of the duty detection circuit.

2. The optical burst receiver according to claim 1, wherein the width of the reset signal from the reset control circuit is smaller than the width of the guard time, and the timing of the reset signal is adjusted so as to fall within the range of the guard time.

3. The optical burst receiver according to claim 1, wherein the threshold voltage adjustment circuit includes: switches that are subjected to on/off control through flip-flop circuits by a High/Low signal obtained by comparing the voltage signal corresponding to the duty ratio from the duty detection circuit and set voltages; and resistors that form a threshold voltage by operating the on/off mode of the switches.

4. The optical burst receiver according to claim 3, wherein the flip-flop circuits are reset to initial values by the reset signal from the reset control circuit.

5. The optical burst receiver according to claim 1, wherein the switches are constituted by MOS-FET.

6. The optical burst receiver according to claim 1, wherein a gain control circuit, which switches the gain into three values by input/output power, is connected in parallel with the transimpedance amplifier that converts the optical burst signal from a current signal to a voltage signal, the arrival of the burst signal is confirmed by the reset signal from the reset control circuit, and the gain of the gain control circuit is reset.

7. An optical burst receiving method of converting an optical burst signal from a current signal to a voltage signal to receive: a burst signal; an optical burst signal including a guard time, a preamble signal including a gain switching preamble signal, a peaking preamble signal, and a duty adjustment preamble signal; and a data signal, the optical burst receiving method comprising:

converting the optical burst signal from a current signal to a voltage signal, setting an initial gain by a reset signal that confirms the arrival of the burst signal, controlling the gain of the preamble signal including the peaking preamble signal and the duty adjustment preamble signal and the data signal according to a voltage level of the gain switching preamble signal, and outputting a differential signal;

resetting the peaking level of the differential signal by the reset signal that confirms the arrival of the burst signal, detecting the peaking preamble signal, setting the peaking level to a normal phase and a reversed phase, and outputting a voltage signal, in which an offset signal of the preamble signal including the gain switching preamble signal and the duty adjustment preamble signal and the data signal are adjusted;

outputting a voltage signal, in which the duty ratio is controlled by a threshold voltage, and in which the offset signal is adjusted;

detecting a burst signal from the voltage signal in which the duty ratio is controlled by the reset signal that confirms the arrival of the burst signal, masking the gain switching preamble signal and the peaking preamble signal in the preamble signal included in the detected burst signal, detecting the duty ratio of a duty switching preamble signal, and converting the burst signal to a voltage signal corresponding to the duty ratio; and adjusting the duty ratio of the gain switching preamble signal, the peaking preamble signal, and the data signal by a new threshold voltage in accordance with the size of the voltage signal corresponding to the duty ratio.

\* \* \* \* \*